W. H. PUTNAM.
ANTISKIDDING DEVICE.
APPLICATION FILED MAR. 1, 1912.
1,045,609. Patented Nov. 26, 1912.
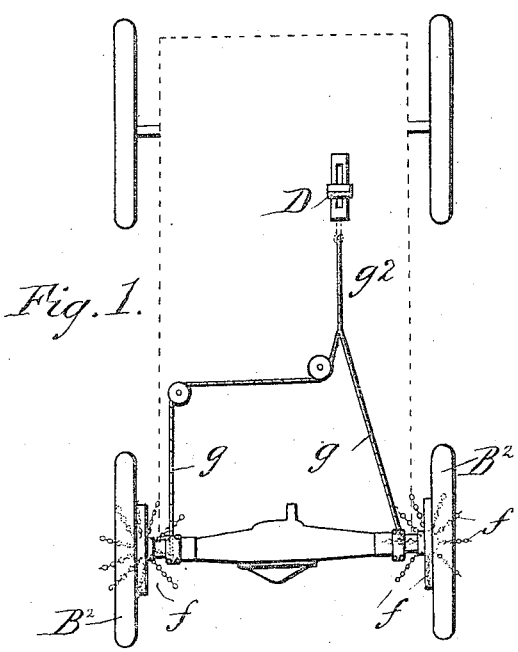
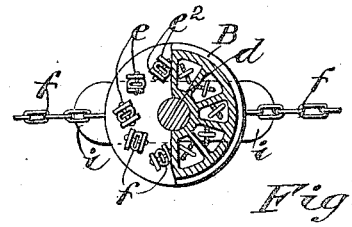
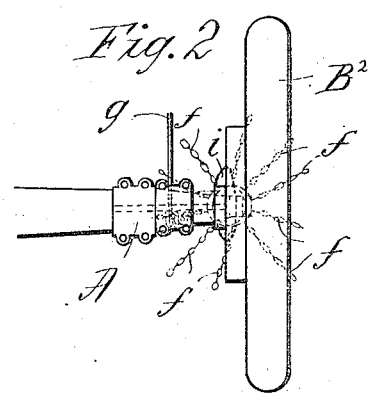
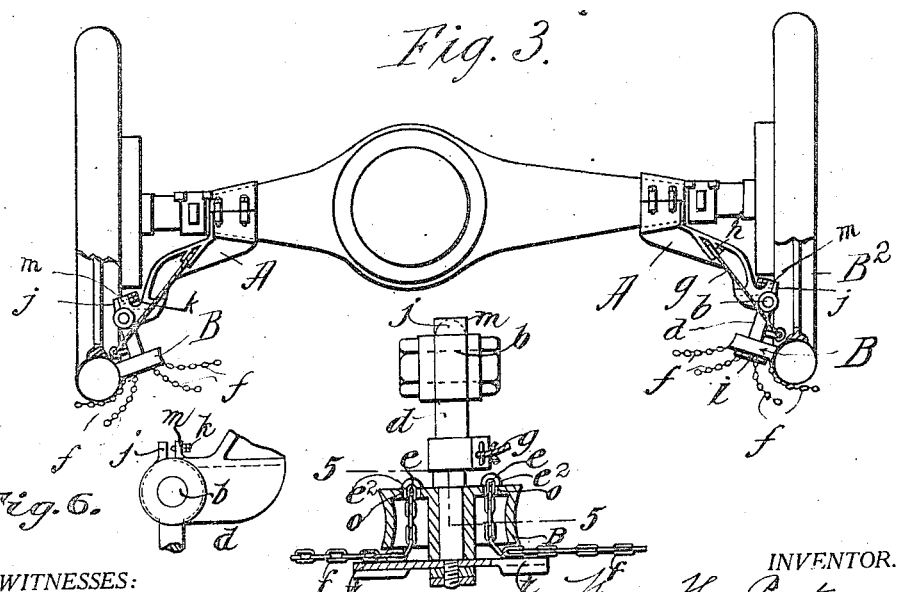
WITNESSES:
INVENTOR.
Wm. H. Putnam
BY
ATTORNEY.

UNITED STATES PATENT OFFICE.

WILLIAM H. PUTNAM, OF NEW YORK, N. Y.

ANTISKIDDING DEVICE.

1,045,609.  Specification of Letters Patent.  Patented Nov. 26, 1912.

Application filed March 1, 1912. Serial No. 680,833.

*To all whom it may concern:*

Be it known that I, WILLIAM H. PUTNAM, a citizen of the United States of America, and resident of New York, in the county of New York and State of New York, have invented certain new and useful Improvements in Antiskidding Devices, of which the following is a full, clear, and exact description.

This invention relates to a device for the prevention of the skidding of automobiles, or power vehicles, and has for its object the provision of rollers which are provided with a plurality of flexible members, such as chains, and which rollers are mounted on brackets on the rear axle of an automobile, and suitable means to cause the rollers to become frictionally engaged against the surface of the tires of the rear wheels by the use of a foot or hand lever at the chauffeur's seat, whereby the rollers will acquire rotary motions, and said flexible members under centrifugal force will be successively thrown under the tire tread for the anti-skidding effect. If desired a similar apparatus may be applied to the front wheels of an automobile, or power vehicle, and controlled by either the same lever which controls the device on the rear axle, or by a separate lever, the levers being of the usual type.

A further object of the device as above set forth is the provision of means for instantaneously engaging the said friction chain pulleys against the tires at any or all speeds at which the vehicle may be traveling, and at the option of the chauffeur or operator, this being accomplished by means of a suitable connection between the chain carrying roller and a lever at the chauffeur's seat.

One of the advantages of this device is its permanent location on the machine, which removes the delays incident to the installing of the usual type of tire chains.

Another advantage of this device is the reduction of tire wear, which, owing to the fact that this device is in use only when desired, greatly minimizes tire wear in comparison with that incidental to the use of tire chains of the common type which are generally in use for extended periods of time. This minimizing of tire wear is in conjunction with a corresponding minimizing of wear resulting to the tire chains of the common type, which being in use for long periods, deteriorate rapidly.

Inasmuch as the real value of tire chains comes into play when an automobile veers from a straight course, my device, by engaging at any speed, is particularly valuable in lessening the danger of accidents resulting from an unlooked for deviation from a straight line. Furthermore, my device, when the machine is proceeding on a straight course, or line, may be raised from its engagement against the tires by action of the foot lever as described, and as long as the vehicle proceeds on a straight line, is neither wearing itself or the tire. Likewise the device may be thrown into use when turning corners, starting or stopping.

The invention is described in conjunction with the accompanying drawings and is set forth in the claims.

In the drawings:—Figure 1 is a diagrammatic plan view showing an automobile and my improved devices operatively applied thereon. Fig. 2 is a plan view showing portions included in Fig. 1 on a larger scale. Fig. 3 is an elevation of the rear wheel of the vehicle and the improved devices in operative relation thereto. Fig. 4 is a sectional elevation of the chain carrying roller and the supporting parts therefor. Fig. 5 is a horizontal sectional view on line 5—5, Fig. 4. Fig. 6 is a detail view showing a construction to be hereinafter referred to.

In the drawings, A represents a bracket supported by the housing for the rear wheel axle and projected downwardly and outwardly toward the wheel $B^2$. The extremity of the bracket A which is toward the wheel is made bifurcated or of a fork construction and receives pivotally therein at $b$ a journal stud or duplicated trunnion formed as a part of a downwardly extending non-rotative shaft $d$ at the lower extremity of which a roller B is connected and capable of rotation, the lower end of the shaft $d$ being suitably formed to constitute a journal therefor. The said roller B is preferably made with a concave periphery, as shown, to more or less nearly conform to the cross sectional contour of the automobile wheel.

The roller B is provided with a plurality of suitably spaced flexible members $f, f$, here exemplified as chains, the same being connected to the roller at points suitably remote from its periphery and adapted under the rotative motion of the roller, when the latter is brought to frictional contact against the automobile which as shown in Fig. 3, to be by centrifugal force thrown to more or less nearly radial relation to the roller. The length of extension of the chain sections $f$ will in practice be from 5 to 7 or 8 inches beyond the lower edge portion of the friction roller.

The friction wheel B and its supporting shaft $d$ are so hung relatively to the portion of the vehicle wheel in tread bearing on the ground that they normally by gravitation assume positions to engage the vehicle wheel as represented in Fig. 3.

Mechanisms or connections are provided so that when the anti-skidding device is to be withdrawn from its coöperative relation to the vehicle wheel the friction roller with its chain-like appurtenances and the roller carrying shaft may be bodily swung inwardly for a quarter of a revolution or less; and in the present instance such means is shown to consist in a cord, chain or other suitable flexible connection $g$ suitably sheave guided, a guiding sheave being understood as carried in the suitably recessed or apertured bracket, at $h$, such connection thence running to connection with a hand or foot lever D located adjacent the driver's seat. This foot lever is understood as being of similar character to shift levers with which automobiles are equipped and in conjunction with which a detent or retaining dog is combined so that under normal running conditions the lever will be held at a position for placing the anti-skid device in its withdrawn or non-effective position in relation to the vehicle wheel.

The friction wheel B is made in the form of an inverted bell, its solid upper portion deriving its journal bearing on the shaft $d$ somewhat above the lower end of the latter, suitable collars or lash preventing means being provided; and the chain sections are secured by cotter pins $e$ extending between pairs of ears $e^2$ for each of the chains provided at the top wall or web of the roller, such sections thence extending downwardly through apertures $a$ therefor and then transversely and outwardly relatively to the lower edge of the roller.

A deflector $i$ carried by the lower extremity or extension of the roller carrying shaft, below the lower portion of the pulley and extending beyond the circumference thereof serves to assist in imparting the radial disposition of the chain sections which pass over them especially at times when the vehicle is running at quite slow speed and before any considerable degree of centrifugal force may be developed.

It is understood that the devices hereinabove described are to be duplicated or further pluralized as the desirability or advantage thereof dictates, and as represented in Fig. 1, a pair of the centrifugally operating and gravitative appliances are represented relatively to the two rear wheels of an automobile, the connections $g$ $g$ for both being merged into and continued in a single connection $g^2$ extending to the foot or hand operating lever or other device for control of the appliances.

The shaft $d$ which is hung in the supporting bracket is provided with an outwardly extending lug $j$ adapted for engagement with an adjustable stop screw or abutment $k$ which is screw engaged through a lug $m$ of the bracket so that motion of the shaft carried roller too far outwardly will be prevented, and so that a chain member $f$ which is subject to the action of the wheel thereon will be ineffective to pull or drag the roller with a too great and tire injuring pressure against the latter.

I claim:—

1. In an anti-skidding device for vehicles, the combination with a vehicle wheel, of a roller mounted adjacent the ground-bearing portion of the wheel having frictional engagement with the wheel, and provided with a plurality of flexible members adapted under centrifugal force to be thrown more or less nearly radially and to engage under the tread of the wheel.

2. In an anti-skid device for vehicles the combination with a vehicle wheel, of a roller mounted inside of and adjacent the tread portion of the wheel, bodily movable to and away from frictional engagement with such portion of the wheel and provided with a plurality of flexible members adapted under centrifugal force to be thrown radially so as to engage under the tread of the wheel, and means for controlling the position of the friction roller whereby it may be in operative relation to the vehicle wheel, or withdrawn therefrom.

3. In an anti-skid device for vehicles, the combination with a vehicle wheel, of a roller mounted inside of and adjacent the tread portion of the wheel, bodily movable to have positions away from, and to be placed into frictional engagement with the portion of the wheel near its tread, and to be thereby rotated,—the said roller being provided with a plurality of flexible members adapted under centrifugal force to be thrown radially so as to successively engage under the tread of the wheel.

4. In an anti-skid device for vehicles, the combination with a vehicle wheel and a stationary bracket mounted inside and adjacent the wheel, of a shaft the upper end of which is pivotally supported on said bracket, a friction roller mounted for rotation on a lower portion of the shaft, and adapted to have a frictional engagement with the wheel near the tread portion thereof, and to be thereby rotated, the said roller being provided with a plurality of flexible members, adapted under centrifugal force to be thrown radially to engage under the wheel tread, and a connection extending from the shaft to a forward portion of the vehicle and controlling means appurtenant thereto.

5. In a device of the character described, the combination with a vehicle wheel, of a roller, mounted inside of and adjacent the tread portion of the wheel, having a concave periphery and adapted to have frictional engagement with the vehicle wheel tire and made hollow, and having the upper wall thereof provided with attachment lugs and apertures through such wall adjacent said lugs, and flexible members secured to the attachment lugs, extending through said apertures into the hollow roller and continued outwardly beyond the lower portion of the latter.

6. In a device of the character described, the combination with a vehicle wheel, of a roller, mounted inside of and adjacent the tread portion of the wheel, having a concave periphery and adapted to have frictional engagement with the vehicle wheel tire and made hollow, and having the upper wall thereof provided with attachment lugs and apertures through such wall adjacent said lugs, and flexible members secured to the attachment lugs, extending through said apertures into the hollow roller and continued outwardly beyond the lower portion of the latter, and the said roller being internally provided with members arranged in separation and serving to prevent the tangling or intertwining of the flexible members one with another.

Signed by me at Springfield, Mass., in presence of two subscribing witnesses.

WILLIAM H. PUTNAM.

Witnesses:
G. R. DRISCOLL,
WM. S. BELLOWS.

Copies of this patent may be obtained for five cents each, by addressing the "Commissioner of Patents, Washington, D. C."